United States Patent [19]

Scheuneman et al.

[11] 4,139,148
[45] Feb. 13, 1979

[54] DOUBLE BIT ERROR CORRECTION USING SINGLE BIT ERROR CORRECTION, DOUBLE BIT ERROR DETECTION LOGIC AND SYNDROME BIT MEMORY

[75] Inventors: James H. Scheuneman, St. Paul; John R. Trost, Anoka, both of Minn.

[73] Assignee: Sperry Rand Corporation, New York, N.Y.

[21] Appl. No.: 827,540

[22] Filed: Aug. 25, 1977

[51] Int. Cl.² ............................................. G06F 11/12
[52] U.S. Cl. ............................... 235/312; 235/303.2; 340/146.1 AL
[58] Field of Search ........................... 235/312, 303.2; 340/146.1 AL; 364/900

[56] References Cited

U.S. PATENT DOCUMENTS

| | | | |
|---|---|---|---|
| 3,755,779 | 8/1973 | Price | 340/146.1 AL |
| 3,893,071 | 7/1975 | Bossen et al. | 340/146.1 AL |
| 3,917,933 | 11/1975 | Scheuneman et al. | 235/303.2 |
| 3,949,208 | 4/1976 | Carter | 235/303.2 |
| 4,005,405 | 1/1977 | West | 340/146.1 AL |
| 4,030,067 | 6/1977 | Howell et al. | 235/312 |

*Primary Examiner*—Charles E. Atkinson

*Attorney, Agent, or Firm*—Kenneth T. Grace; William E. Cleaver; Marshall M. Truex

[57] ABSTRACT

A method of and an apparatus for obtaining double bit error correction capabilities in a large scale integrated (LSI) semiconductor memory system using only single bit error correction, double bit error detection (SEC, DED) logic are disclosed. The method is based upon the statistical assumption that in a large scale integrated semiconductor memory, substantially all errors in the data bits that make up a data word are initially a single bit error and that increasing multiple, i.e., double, triple, etc., bit errors occur in a direct increasing ratio of the use or selection of the data word. In the present invention, all data words are priorly tested to be error free. Subsequent detection of single bit errors results in the correction of the single bit error and the storage of the single bit error correcting syndrome bits in a syndrome bit memory. Subsequent detection of double bit errors, in the previously single bit error detected and corrected data words, results in the correction, by single bit error correcting syndrome bits, of the previously detected single bit error. This single bit error corrected data word is then again single bit error corrected, i.e., two successive single bit error corrections, to provide a twice corrected double bit error data word.

5 Claims, 13 Drawing Figures

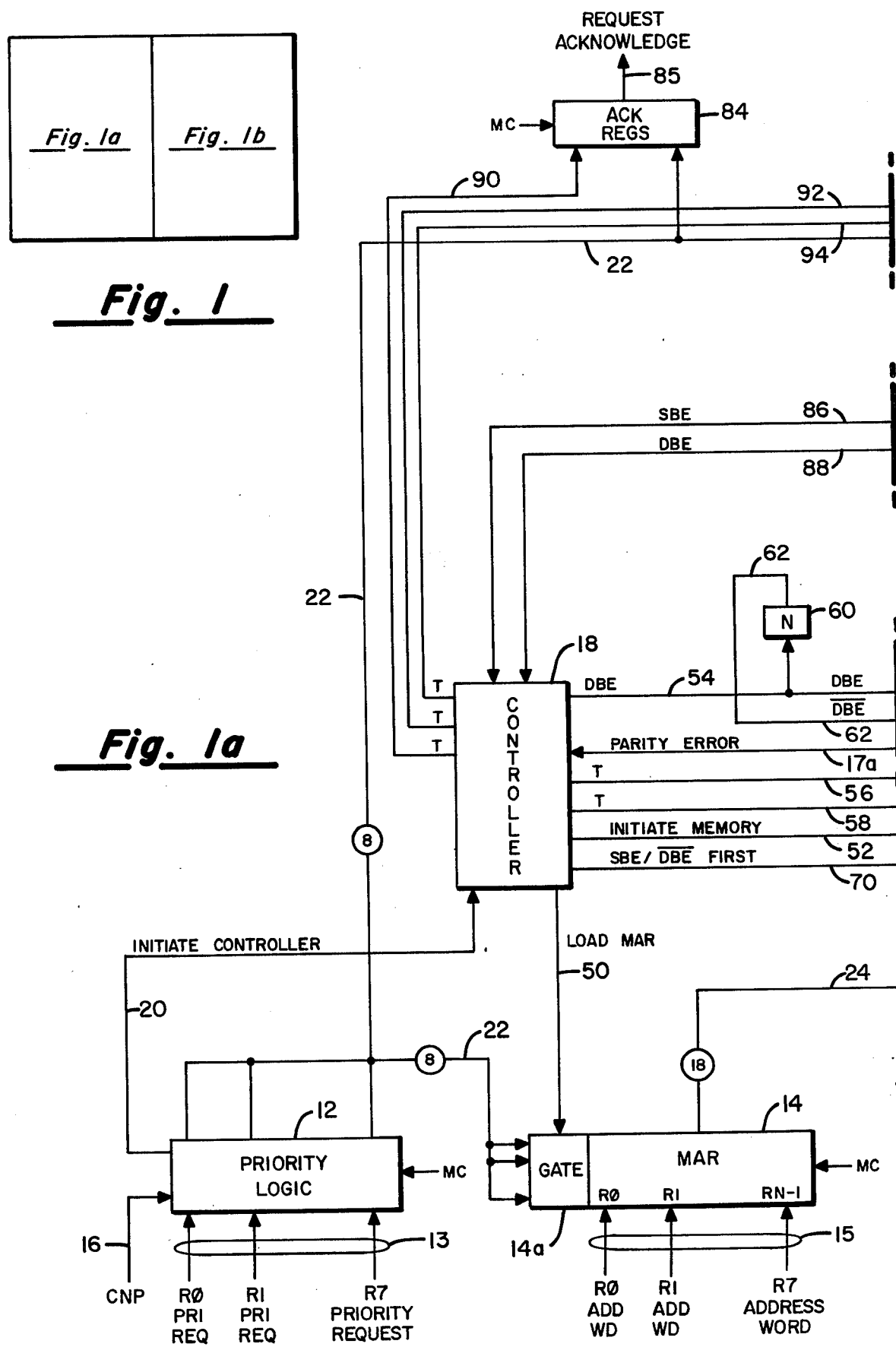

SBE SINGLE BIT ERROR

DBE AFTER SBE

DBE BEFORE SBE OR
SYNDROME BIT PARITY ERROR

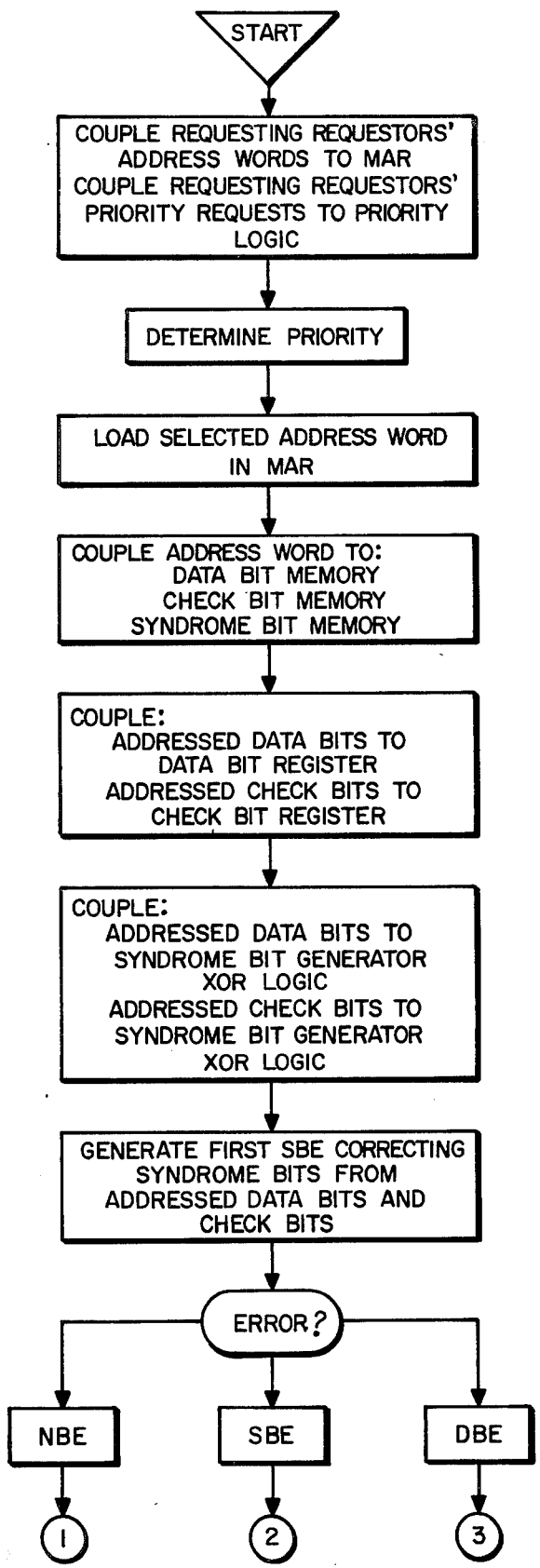
Fig. 3a
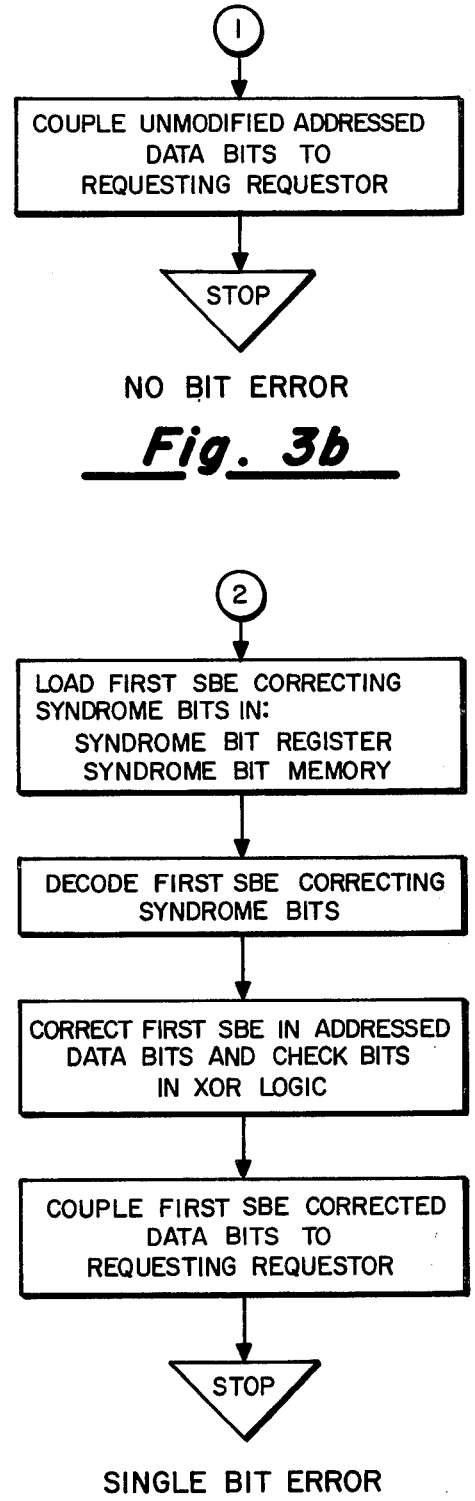
NO BIT ERROR
Fig. 3b
SINGLE BIT ERROR
Fig. 3c

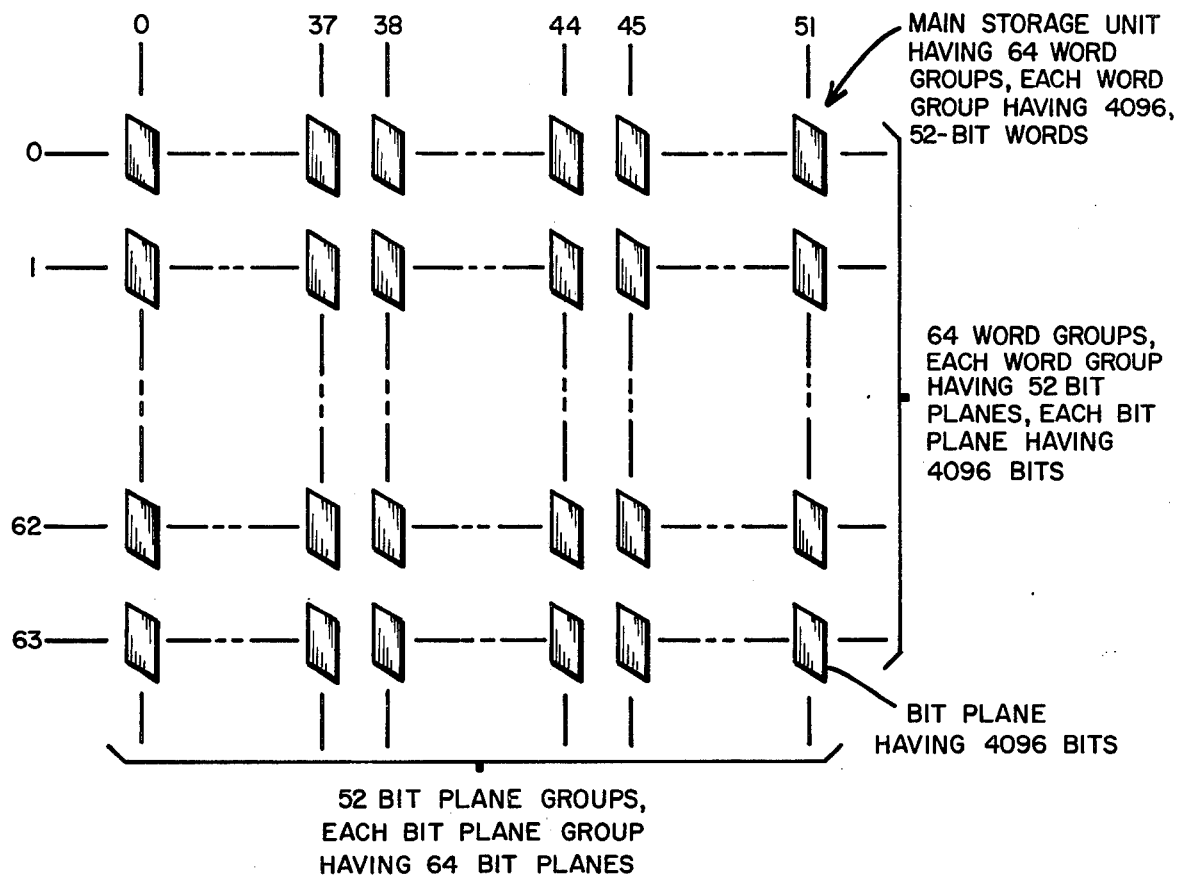
Fig. 4
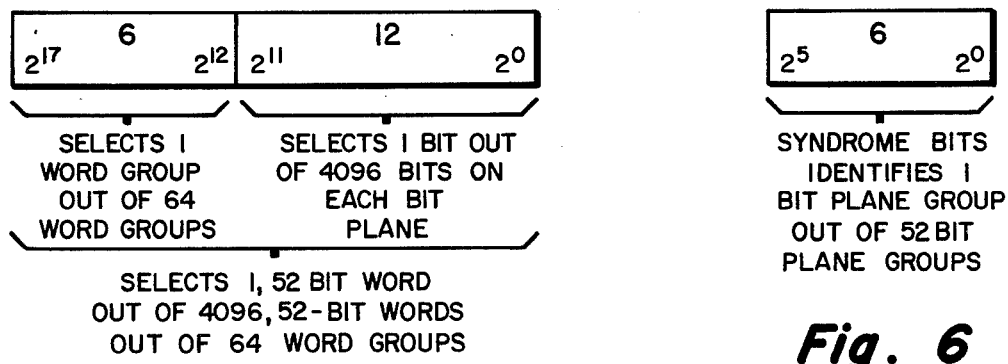
Fig. 5
Fig. 6

DOUBLE BIT ERROR CORRECTION USING SINGLE BIT ERROR CORRECTION, DOUBLE BIT ERROR DETECTION LOGIC AND SYNDROME BIT MEMORY

BACKGROUND OF THE INVENTION

Semiconductor storage units made by large scale integrated circuit techniques have proven to be cost-effective for certain applications of storing digital information. Most storage units are comprised of a plurality of similar storage devices or bit planes, each of which is organized to contain as many storage cells or bits as is feasible in order to reduce per bit costs and to also contain addressing, read and write circuits in order to minimize the number of connections to each storage device. In many designs, this has resulted in an optimum storage device or bit plane that is organized as N words of 1 bit each, where N is some power of two, typically 256, 1,024 or 4,096. Because of the 1 bit organization of the storage device, single bit error correction, double bit error detection as described by Hamming in the publication "Error Detecting and Correcting Codes," R. W. Hamming, The Bell System Journal, Volume XXVI, April 1950, No. 2, Pages 147-160, has proven quite effective in allowing partial or complete failure of a single storage cell or bit in a given word, i.e., a single bit error, the word being of a size equal to the word capacity of the storage device, without causing loss of the data readout from the storage unit. This increases the effective mean-time-between-failure (MTBF) of the storage unit.

Because the storage devices are quite complex, and because many are used in a semiconductor storage unit, they usually represent the predominate component failure in a storage unit. Consequently, it is common practice to employ some form of single bit error correction, double bit error detection along the lines described by Hamming. Also see the publication "Cyclic Codes For Error Detection", W. W. Peterson, et al, Proceedings of the IRE, Vol. 49, January 1961, pages 228-235. While single bit error correction allows for tolerance of storage cell failures, as more of them fail the statistical chance of finding two of them, i.e., a double bit error, in the same word increases. Since two failing storage cells in the same word cannot be corrected without relatively complicated logic as compared with that required by single bit error correction, double bit error detection, it has been the practice to perform regular preventative maintenance upon the storage unit, at which time all replaceable bit planes of the storage unit in which single bit errors have been previously determined would be replaced by new error free bit planes. Such a system utilizes program error logging of the addresses that identify the bit planes that are to be replaced, or, alternatively, the use of error logging stores in which the address of each bit plane in which a single bit error has been detected is logged or stored in a separate buffer memory. Such error logging stores, by assuring proper preventative maintenace procedures, statistically eliminate the possibility of an uncorrectable double bit error in a large scale integrated storage unit using single bit error correction, double bit error detection logic. Such error logging stores in LSI memory storage units are disclosed in my U.S. Pat. No. 3,917,933 and the R. J. Petschauer, U.S. Pat. Nos. 3,906,200 and 3,999,051. Although such error logging stores in LSI semiconductor memory storage units have achieved wide use, it is desirable that double bit error correction, multiple bit error detection (DEC, MED) capabilities be provided if the complex and costly logic usually associated therewith can be avoided. It is, accordingly, a primary object of the present invention to provide such double bit error correction capabilities in a LSI semiconductor memory storage unit while yet avoiding the complex and costly logic that is usually associated with the known prior art double bit error correction techniques.

SUMMARY OF THE INVENTION

The present invention utilizes an error logging store or syndrome bit memory in combination with a data bit memory, a check bit memory and single bit error correction, double bit error detection (SEC, DED) error coding and logic to achieve both single bit and double bit error correction of the associated data word. Initially, the stored data word (which data word consists of the data bits that are stored in the data bit memory and the check bits that are stored in the check bit memory, both of which are stored at a single addressable data word location in the LSI semiconductor storage unit) is error free upon readout. When upon readout of the data bits and the check bits the syndrome bit generator portion of the SEC, DED logic detects a single bit error, the syndrome bits are generated in the usual manner and are used to correct the single bit error in the data word and are then stored in the syndrome bit memory portion of the associated data word addressable location of the storage unit. When upon readout of the data bits and the check bits of the previously single bit error corrected data word, the syndrome bit generator detects a double bit error, the single bit error correcting syndrome bits that are now stored in the associated syndrome bit memory portion of the data word addressable location are utilized to correct the previously detected single bit error. The single bit error corrected data word is then again effected by the syndrome bit generator to generate the syndrome bits that identify in it the to-be-corrected second bit in error. The twice single bit error corrected data bits are then coupled to the requesting requestor while the first single bit correcting syndrome bits are retained in the associated syndrome bit memory addressable location of the twice single bit error corrected data word.

BRIEF DESCRIPTION OF THE DRAWINGS

FIGS. 3a, 3b, 3c, 3d are illustrations of flow diagrams of the related operations of the memory system of FIG. 1.

FIG. 4 is an illustration of how the replaceable 262K 4096-bit bit planes are configured in the RAM of FIG. 1.

FIG. 5 is an illustration of the format of an address word that is utilized to address an addressable location in the RAM of FIG. 1.

FIG. 6 is an illustration of the format of the syndrome bits generated by the syndrome bit generator of FIG. 1.

DESCRIPTION OF THE PREFERRED EMBODIMENT

Figure 1B:
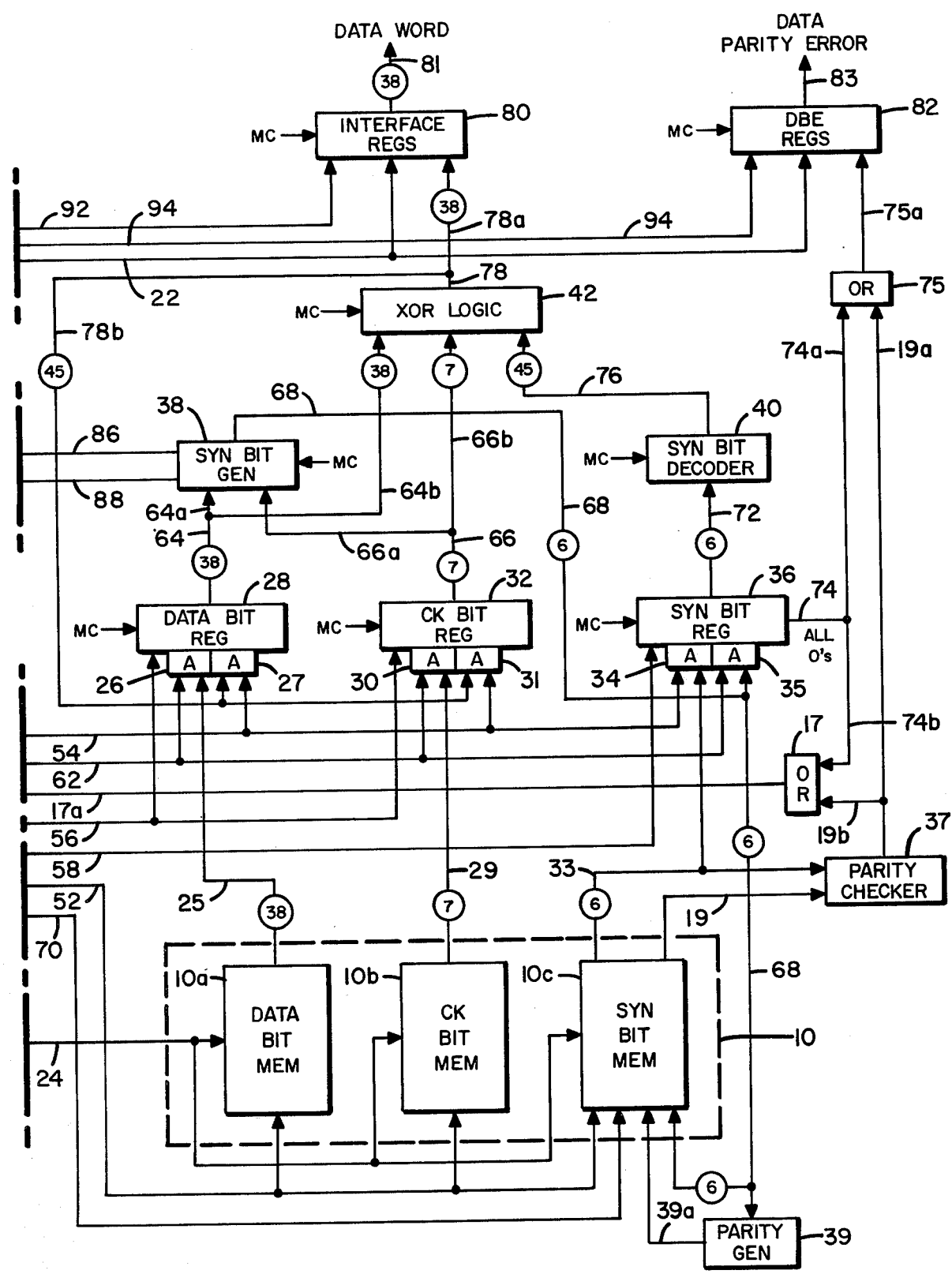
FIG. 1, consisting of FIGS. 1a, 1b, is a block diagram of a memory system incorporating the present invention.

With particular reference to FIGS. 1a, 1b and FIGS. 2a, 2b, 2c, 2d and FIGS. 3a, 3b, 3c, 3d, there are presented a block diagram of a memory system incorporating the present invention, timing diagrams of typical operations thereof and flow diagrams of a functional description of the typical operations thereof, respectively. In the electronic data processing system into which the memory system of FIG. 1 is included, there are utilized a plurality of, e.g., N = 8, requestors R0 through R7. All requestors R0 through R7, via their associated Priority Request signals may simultaneously request access to the associated main random access memory (RAM) 10 for which a conflict of requests would be realized. Accordingly, in such an electronic data processing system the requestors, which are assigned different numerical priority ratings, couple their Priority Request signals to priority determination logic. Priority logic 12 determines which one of the up to, e.g., 8 requestors R0 through R7 that may be simultaneously requesting access to the associated RAM 10 is to be granted priority. More advanced priority systems may provide rotational priority between requestors based upon the accumulated priority history—see the M. Danilenko U.S. Pat. No. 4,009,470.

In the embodiment of FIG. 1, each of the requestors R0 through R7, when requesting access to RAM 10, concurrently couples to priority logic 12, via cable 13, its associated Priority Request signal and couples, to memory address register (MAR) 14, via cable 15, its associated address (word) of the addressable location in RAM 10 to which it seeks access. At given times, usually determined by the receipt of a Priority Request signal on cable 13 from a requestor or by internal RAM 10 timing, priority logic 12 is affected by a Clock New Priority (CNP) signal, as on line 16. The CNP signal gates into priority logic 12 all Priority Request signals coupled thereto at that (CNP) time. Priority logic 12 then determines which one of the up to 8 Priority Request signals, from the associated requestors R0 through R7, is to be granted priority. Priority logic 12 then generates an Initiate Controller signal, which Initiate Controller signal initiates memory access timing via line 20. Controller 18 also couples to MAR 14, via a Load MAR signal on line 50, the decoded output of priority logic 12 via the one activated 8 lines of cable 22. The one activated line of cable 22 enables gate 14a of MAR 14 to accept the address word that is associated with the one requestor that has been granted priority by priority logic 12. This address word from MAR 14, is then concurrently coupled to data bit memory 10a, check bit memory 10b and syndrome bit memory 10c of RAM 10, via cable 24.

RAM 10 is of a well-known design configured according to FIG. 4. RAM 10 is an LSI semiconductor memory having, e.g., 262K words each of 52 bits in length containing 38 data bits, 7 check bits (including one overall parity bit) and 6 syndrome bits (and 1 parity bit for the 6 syndrome bits). RAM 10 is organized into 64 word groups, each word group having 52 bit planes, each bit plane being a large scale integrated (LSI) plane of 4,096 bits or memory locations. The like-ordered bit planes of each of the 64 word groups are also configured into 52 bit plane groups, each of 64 bit planes. Addressing of RAM 10 is by concurrently selecting one out of the 64 word groups and one like-ordered bit out of the 4,096 bits of each of the 52 bit planes in the one selected word group. This causes the simultaneous readout, i.e., in parallel, of the 38 data bits and the 7 check bits, including one overall parity bit that specifies the bit location of the single bit error in the associated data word, that make up the data word and the 6 single bit error correcting syndrome bits, and the syndrome associated parity. Addressing of the one selected or addressable location in RAM 10 as defined by the address word in MAR 14 couples:

38 data bits from data bit memory 10a, via cable 25 to AND 26 of data bit register 28;

7 check bits, including one overall parity bit, from check bit memory 10b, via cable 29 to AND 30 of check bit register 32; and, 6 syndrome bits, from syndrome bit memory 10c, via cable 33, to AND 34 of syndrome bit register 36.

With particular reference to FIG. 5 there is illustrated the format of an address word that is utilized to select or address one word out of the 262K words that are stored in RAM 10. In this configuration of the address word, the higher-ordered 6 bits, $2^{17}$–$2^{12}$ according to 1's or 0's in the respective bit positions $2^{17}$–$2^{12}$, select or address one word group out of the 64 word groups while the lower-ordered 12 bits $2^{12}$–$2^0$, select or address one bit out of the 4,096 bits on each of the 52 bit planes in the word group that is selected by the higher-ordered bits $2^{17}$–$2^{12}$.

As stated hereinabove, the method of the present invention obtains double error correction capabilities in a LSI memory system using only single error correction, double error detection logic (SEC, DED). The method is based upon the statistical assumption that in a large scale integrated semiconductor memory, substantially all errors in the data bits that make up the data word are initially a single bit error and that increasing multiple, i.e., double, triple, etc. bit errors occur in a directly increasing ratio of the use or selection of the data bits. In the present invention, all data bits are priorly tested to be error free. Subsequent detection of single bit errors results in the correction of the single bit error and the storage of the single bit error syndrome bits in syndrome bit memory 10c. Subsequent detection of double bit errors, in the previously detected single bit error data bits, results in the correction, by the single bit error correction syndrome bits previously stored in syndrome bit memory 10c of the previously detected single bit error. These single bit error corrected data bits are then again single bit error corrected, i.e., two successive single bit error corrections, to provide a twice corrected double bit error data word. This single bit error correcting, double bit error detecting capability is provided by syndrome bit generator 38, syndrome bit decoder 40 and Exclusive OR (XOR) logic 42.

Such single bit error correction, double bit error detection utilizes well-known error correction and detection techniques—see the publication "Error Detecting and Correcting Codes," R. W. Hamming, The Bell System Journal, Volume XXVI, April 1950, No. 2, pages 146–160. For the single bit error correction, double bit error detection of the 38 data bits that are stored in data bit memory 10a and the 7 check bits, including one overall parity bit, that are stored in check bit memory 10b, syndrome bit generator 38 generates 6 syndrome bits, the format of which is illustrated in FIG. 5 and which will be explained in more detail hereinabove, is, via line 68, coupled to syndrome bit register 36, via AND 35, and to syndrome bit memory 10c.

Figure 2A:
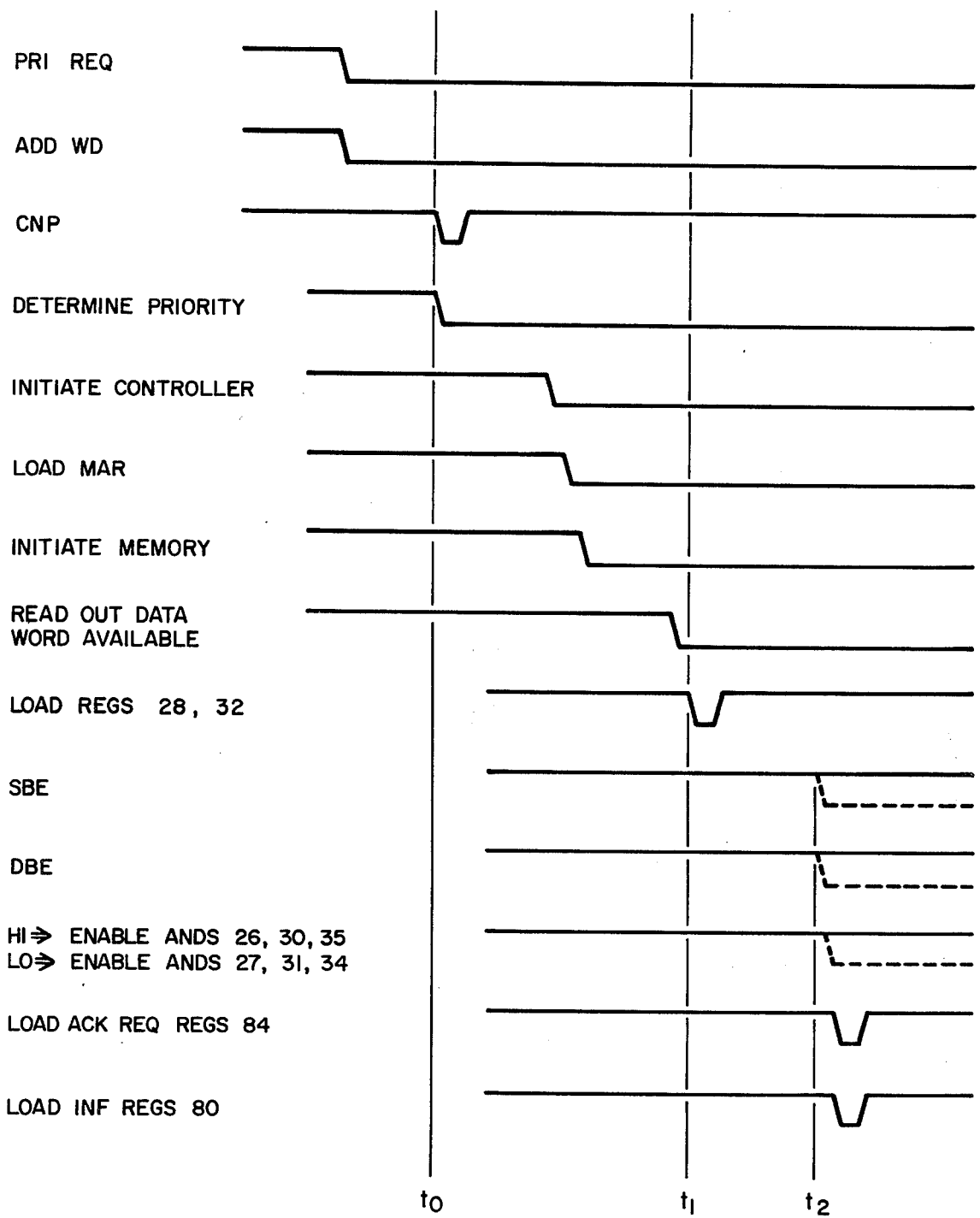
FIGS. 2a, 2b, 2c, 2d are exemplary timing diagrams associated with the related operations of the memory system of FIG. 1.
Figure 2B:
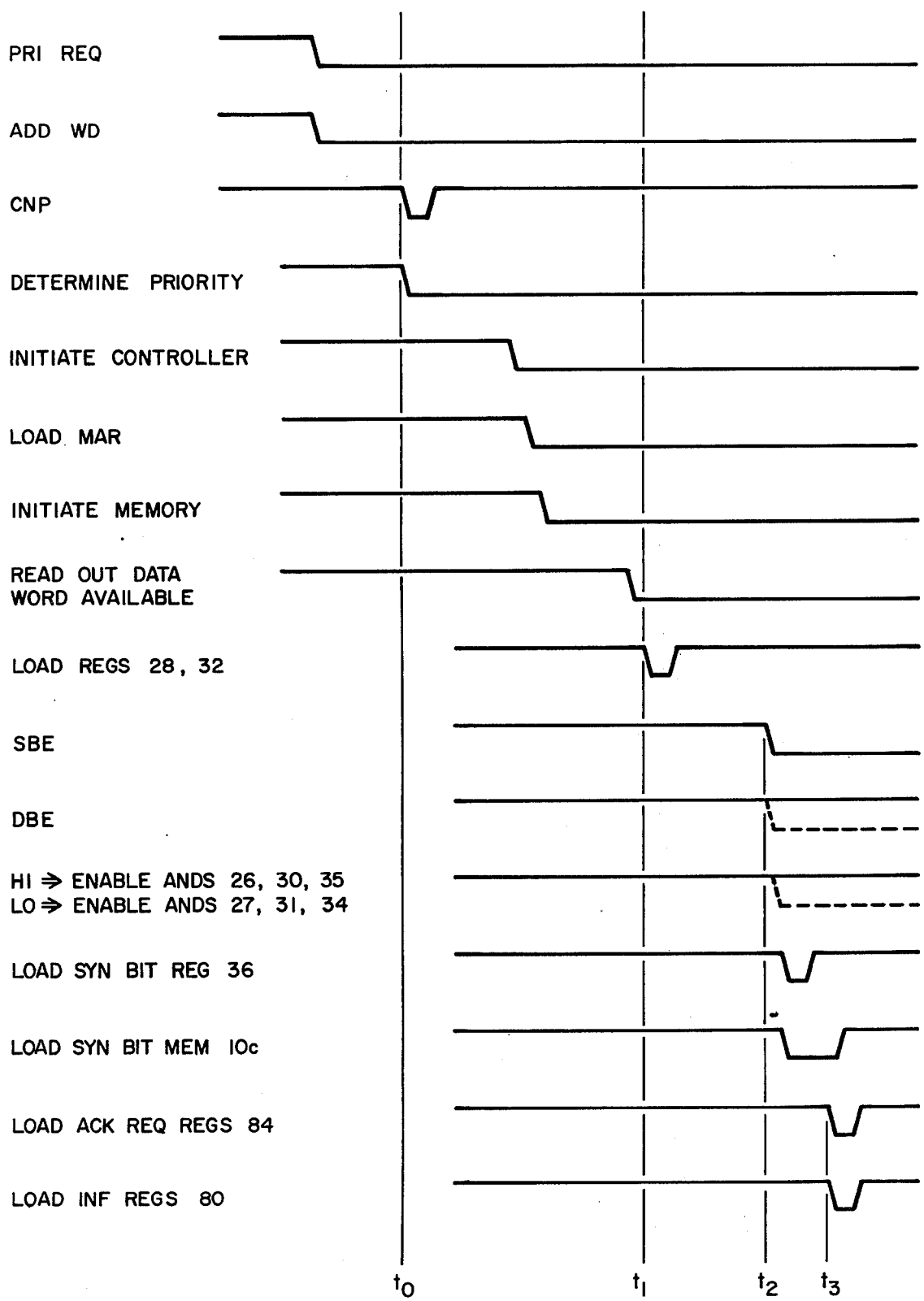
Figure 2C:
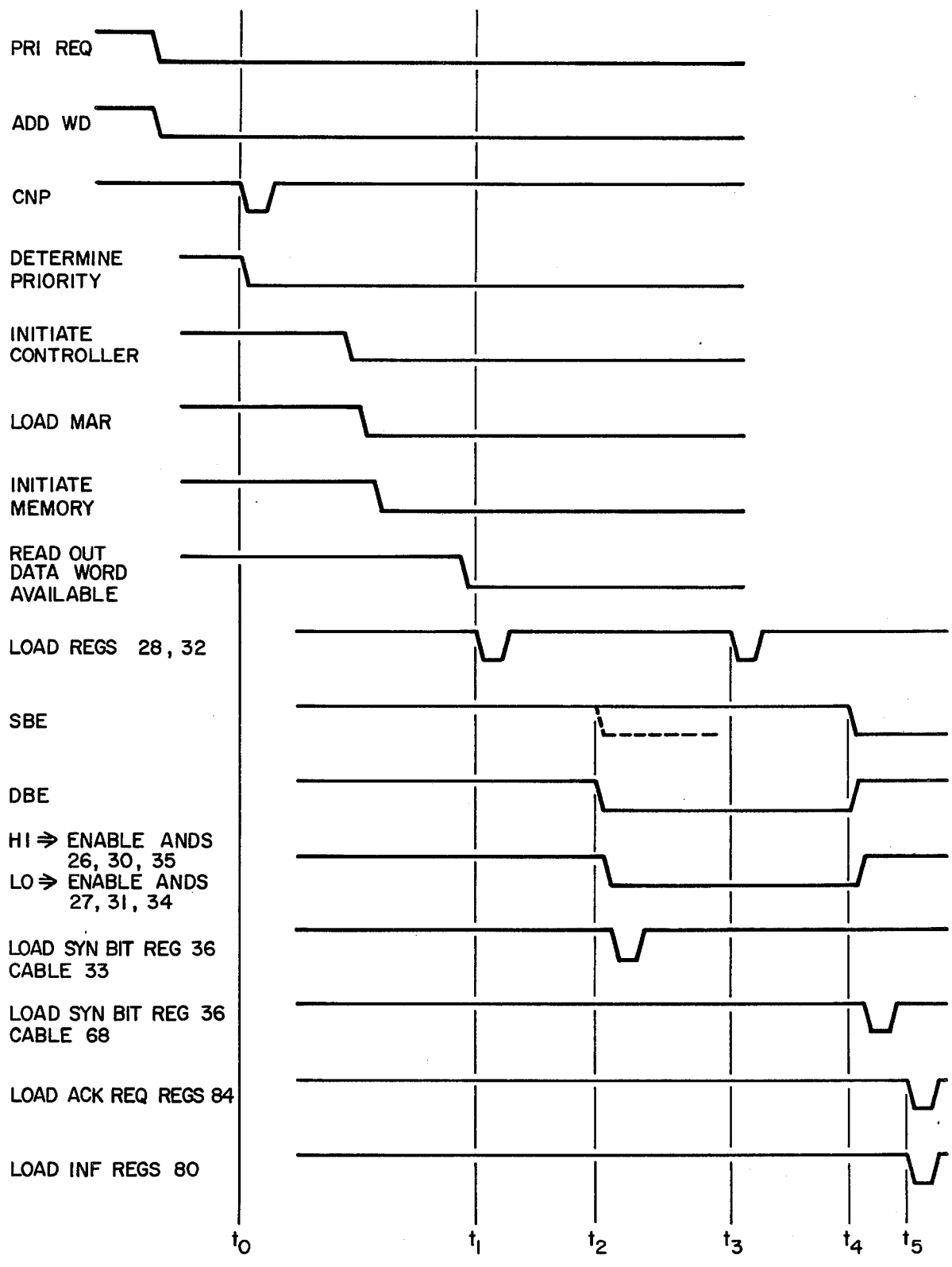
Figure 2D:
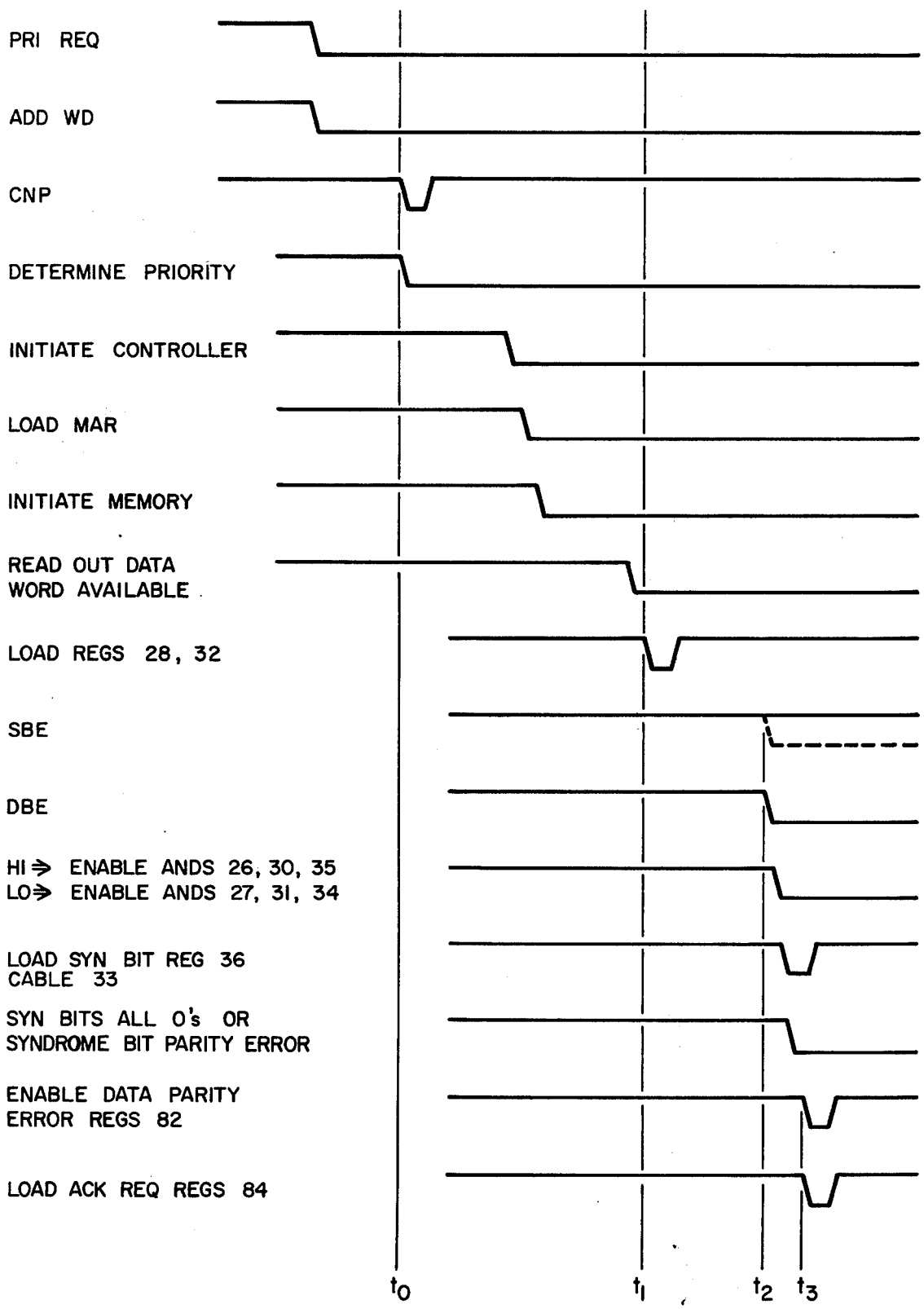

With particular reference to FIGS. 2a through 2d there are presented timing diagrams for the following series of operations of a memory system incorporating the present invention:

FIG. 2a is a timing diagram of a memory system in which no bit error (NBE) is detected in the readout data word;

FIG. 2b is a timing diagram of a memory system in which a single bit error (SBE) is detected in the readout data word;

FIG. 2c is a timing diagram of a memory system in which a double bit error (DBE) is detected in the readout data word and in which a SBE was previously detected and corrected in the data word by the memory system; and, FIG. 2d is a timing diagram of a memory system in which a DBE is detected in a readout data word and in which an SBE was not previously detected and corrected in the data word by the memory system.

NO BIT ERROR

With references now to FIGS. 2a, 3a and 3b there is illustrated the operation of a memory system that is initially, i.e., as at a time prior to $t_0$, between memory operations and in which during a subsequent read operation NBE is detected in the readout data word. During predetermined sampling periods, as denoted by clock new priority (CNP) times, one or more of the $N = 8$ requesting requestors R0 through R7 couple their Priority Request signals to priority logic 12, via cable 13, and their requestor address words to MAR 14 via cable 15. At the end of the predetermined sample time, as at time $t_0$, a CNP signal is coupled to priority logic 12 via line 16, which CNP signal initiates the priority determination by priority logic 12. At the end of the priority determination, priority logic 12 couples an Initiate Controller signal to controller 18 via line 20 and an active signal to one of the $N = 8$ lines of cable 22, which active signal is representative of the one requesting requestor that has been granted priority by priority logic 12.

The Initiate Controller signal on line 20 initiates a timing chain in controller 18, which via line 50, couples a Load MAR signal to gates 14a of MAR 14 loading into MAR 14 the requestor address word on cable 15 that is associated with the one requesting requestor that was granted priority by priority logic 12. Next, the timing chain in controller 18 couples to line 52 an Initiate Memory signal. With the requestor address word on cable 24 being coupled to RAM 10, the Initiate Memory signal on line 52 selects or addresses the one addressable location in data bit memory 10a, check memory 10b and syndrome bit memory 10c as defined by the address bits of the requestor address word on cable 24. This causes the simultaneous, i.e., in parallel, readout of:

38 data bits from data bit memory 10a, and, via cable 25, the coupling to AND 26 of data bit register 28;

7 check bits, including one overall priority bit, from check bit memory 10b and, via cable 29, the coupling to AND 30 of check bit register 32; and, 6 syndrome bits from syndrome bit memory 10c and, via cable 33, the coupling to AND 34 of syndrome bit register 36, and the 1 syndrome parity bit on line 19.

At this time, at time $t_1$, controller 18 is coupling an inactive DBE signal to line 54 which disables AND 27, and 31 and AND 34 and which, via inverter (N) 60 and line 62, enables AND 26, AND 30 and AND 35. Additionally, at this time the timing chain in controller 18 couples to line 56 an active signal, which via the enabled AND 26 and AND 30 loads the data bits from data bit memory 10a on cable 25 into data bit register 28 and loads the check bits from check bit memory 10b on cable 29 into check bit register 32. At time $t_1$ then, the 38 data bits in cable 64 are, via cable 64a, coupled to syndrome bit generator 38 and, via cable 64b, coupled to XOR logic 42 while the 7 check bits on cable 66 are, via cable 66a, coupled to syndrome bit generator 38 and, via cable 66b, coupled to XOR logic 42. After the delay required to generate the 6 syndrome bits and as the 38 data bits and 7 check bits that are coupled to syndrome bit generator 38 via their associated cables 64a and 66a, respectively, are error free, syndrome bit generator 38 couples to controller 18 an inactive SBE signal, via line 86, and an inactive DBE signal, via line 88. This error free condition (NBE) of the 38 data bits and 7 check bits presently held in data bit register 38 and check bit register 32, respectively, causes the timing chain in controller 18 to couple active signals to lines 90 and 92 whereby the Request Acknowledge signal, via request acknowledge registers 84 at line 85 and the 38 data bits via interface register 80 and cable 81 are coupled to the one requesting requestor that was granted priority by priority logic 12. Lastly, at this time the NBE condition of the 38 data bits in data bit register 28 and the 7 check bits in check bit register 32 causes controller 18 to terminate memory operation until receipt of the next subsequent CNP signal on line 16.

SINGLE BIT ERROR

With reference now to FIGS. 2b, 3a and 3c there is illustrated the operation of a memory system that is initially, i.e., as at a time prior to $t_0$, between memory operations and in which during a subsequent read operation a single bit error (SBE) is detected in the readout data word. As discussed hereinabove with respect to FIG. 2a, during predetermined sampling periods as denoted by clock new priority (CNP) times, one or more of the $N = 8$ requesting requestors R0 through R7 couple their Priority Request signals to priority logic 12 via cable 13, and their requestor address words to MAR 14 via cable 15. At the end of the predetermined sample time, as at time, $t_0$, a CNP signal is coupled to priority logic 12 via line 16, which CNP signal initiates the priority determination by priority logic 12. At the end of the priority determination, priority logic 12 couples an Initiate Controller signal to controller 18 via line 20 and an active signal to one of the $N = 8$ lines of cable 22, which active signal is representative of the one requesting requestor that has been granted priority by priority logic 12.

The Initiate Controller signal on line 20 initiates a timing chain in controller 18, which, via line 50, couples a Load MAR signal to gates 14a of MAR 14 loading into MAR 14 the requestor address word on cable 15 that is associated with the one requesting requestor that was granted priority by priority logic 12. Next, the timing chain in controller 18 couples to line 52 an Initiate Memory signal. With the requestor address word on cable 24 being coupled to RAM 10, the Initiate Memory signal on line 52 selects or addresses the one addressable location in data bit memory 10a, check bit memory 10b and syndrome bit memory 10c as defined by the address bits of the requestor address word on cable 24. As discussed with respect to FIG. 2a, this causes the simultaneous readout of the 38 data bits from data bit memory 10a, the 7 check bits, including one overall parity bit, from check bit memory 10b and, the 6 syndrome bits and the 1syndrome parity bit from syndrome bit memory 10c.

At this time, at time $t_1$, controller 18 is coupling an inactive DBE signal to line 54 which disables AND 27, AND 31 and AND 34 and which, via inverter (N) 60 and line 62, enables AND 26, AND 30 and AND 35. Additionally, at this time the timing chain in controller 18 couples to line 56 an active signal, which via the enabled AND 26 and AND 30 loads the data bits from data bit memory 10a, on cable 25 into data bit register 28 and loads the check bits from check bit memory 10b on cable 29 into check bit register 32. At time $t_1$ then, 38 data bits on cable 64 are, via cable 64a, coupled to syndrome bit generator 38 and, via cable 64b, coupled to XOR logic 42 while the 7 check bits on cable 64 are, via cable 66a, coupled to syndrome bit generator 38 and, via cable 66b, coupled to XOR logic 42. After the delay required to generate the single bit error correcting syndrome bits, as at time $t_2$, syndrome bit generator 38 couples the single bit error correcting syndrome bits, via cable 68, to AND 35 of syndrome bit register 36 and to syndrome bit memory 10c. Also at this time, syndrome parity bit generator 39 generates and couples to syndrome bit memory 10c the 1 syndrome parity bit generated from the 6 syndrome bits on cable 68.

As the 38 data bits and 7 check bits that are coupled to syndrome bit generator 38 via their associated cables 64a and 66a, respectively, contain a single bit error, syndrome bit generator 38 at time $t_2$ couples to controller 18 an active SBE signal, via line 86, and an inactive DBE signal, via line 88. This single bit error condition (SBE) of the 38 data bits and 7 check bits presently held in data bit register 38 and check bit register 32, respectively, causes the timing chain in controller 18 to couple an active signal to syndrome bit register 36 via line 58, loading the syndrome bits on cable 68, via the enabled AND 35, into syndrome bit register 36 and an active signal to syndrome bit memory 10c, via line 70, loading the syndrome bits on cable 68 and the syndrome parity bit on line 39a into syndrome bit memory 10c. The syndrome bits are then, via cable 72, coupled to syndrome bit decoder 40, which after the delay required to decode the syndrome bits coupled thereto, couples an active signal to one of the 45 lines of cable 76 indicating the bit position in the 38 data bits and the 7 check bits that are coupled to XOR logic 42 in which the single bit error (SBE) lies. After the delay required to perform the error correction upon the 38 data bits and the 7 check bits coupled thereto, XOR logic 42 couples to cable 78 the modified, i.e., corrected, 38 data bits and 7 check bits coupled thereto by data bit register 28 and check bit register 32, respectively. Also this, at time $t_3$, causes the timing chain in controller 18 to couple active signals to lines 90 and 92 whereby the Request Acknowledge signal, via request acknowledge registers 84 and line 85 and the 38 data bits via interface registers 80 and cable 81 are coupled to the one requesting requestor that was granted priority by priority logic 12. Lastly, at this time the single bit error corrected condition of the 38 data bits in data bit register 28 and the 7 check bits in check bit register 32 causes controller 18 to terminate memory operation until receipt of a subsequent CNP signal on line 16.

DOUBLE BIT ERROR AFTER SINGLE BIT ERROR

Figure 3D:
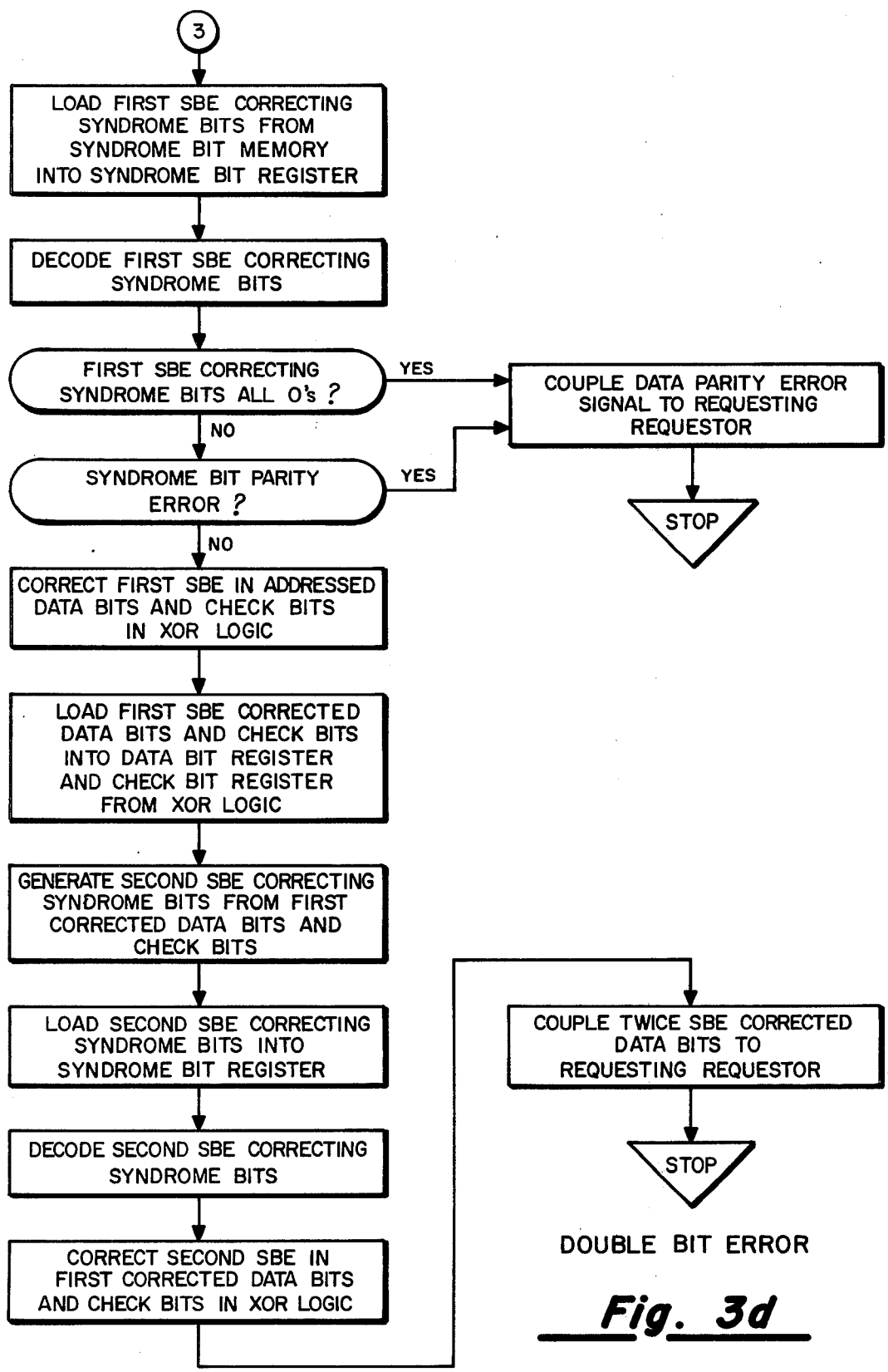

With reference now to FIGS. 2c, 3a and 3d, there is illustrated the operation of a memory system that is initially, i.e., as at a time prior to $t_0$, between memory operations and in which during a subsequent read operation a double bit error (DBE) is detected in the readout data word in which a single bit error (SBE) has been previously detected and corrected. As discussed hereinabove with respect to FIG. 2a, during predetermined sampling periods as denoted by clock new priority (CNP) times, one or more of the N = 8 requesting requestors R0 through R7 couple their Priority Request signals to priority logic 12 via cable 13, and their requestor address words to MAR 14 via cable 15. At the end of the pedetermined sample time, as at time $t_0$, a CNP signal is coupled to priority logic 12 via line 16, which CNP signal initiates the priority determination by priority logic 12. At the end of the priority determination, priority logic 12 couples an Initiate Controller signal to controller 18 via line 20 and an active signal to one of the N = 8 lines of cable 22, which active signal is representative of the one requesting requestor that has been granted priority by priority logic 12.

The Initiate Controller signal on line 20 initiates a timing chain in controller 18, which, via line 50, couples a Load MAR signal to gates 14a of MAR 14 loading into MAR 14 the requestor address word on cable 15 that is associated with the one requesting requestor that is granted priority by priority logic 12. Next, the timing chain in controller 18 couples to line 52 an Initiate Memory signal. With the requestor address word on cable 24 being coupled to RAM 10, the Initiate Memory signal on line 52 selects or addresses the one addressable location in data bit memory 10a, check bit memory 10b and syndrome bit memory 10c as defined by the address bits of the requestor address word on cable 24. As discussed with respect to FIG. 2a, this causes the simultaneous readout of the 38 data bits from data bit memory 10a, the 7 check bits, including one overall parity bit, from check bit memory 10b and the 6 syndrome bits and the 1 syndrome parity bit from syndrome bit memory 10c.

At this time, at time $t_1$, controller 18 is coupling an inactive DBE signal to line 54 which disables AND 27, AND 31 and AND 34 and which, via inverter (N) 60 and line 62, enables AND 26, AND 30 and AND 35. Additionally, at this time the timing chain in controller 18 couples to line 56 an active signal, which via the enabled AND 26 and AND 30 loads the data bits from data bit memory 10a on cable 25 into data bit register 28 and loads the check bits from check bit memory 10b on cable 29 into check bit register 32. At time $t_1$ then, the 38 data bits on cable 64 are, via cable 64a, coupled to syndrome bit generator 38 and, via cable 64b, coupled to XOR logic 42 while the 7 check bits on cable 66 are, via cable 66a, coupled to syndrome bit generator 38 and, via cable 66b, couples to XOR logic 42.

As the 38 data bits and 7 check bits that are coupled to syndrome bit generator 38 via their associated cables 64a and 66a, respectively, contain a double bit error (DBE), syndrome bit generator 38 at time $t_2$ couples to controller 18 an inactive SBE signal, via line 86, and an active DBE signal, via line 88. This double bit error condition (DBE) of the 38 data bits and 7 check bits presently held in data bit register 38 and check bit register 32, respectively, causes the timing chain in controller 18 to couple an active DBE signal to line 54, which enables AND 27, AND 31 and AND 34 and which, via inverter (N) 60 and line 62, disables AND 26, AND 30 and AND 35. Next, controller 18 couples to line 58 an active signal whereby the enabled AND 34 loads the readout single bit error correcting syndrome bits from syndrome bit memory 10a on cable 33 into syndrome bit register 36. The single bit error correcting syndrome bits in syndrome bit register 36 are then, via cable 72, coupled to syndrome bit decoder 40, which after the delay required to decode the syndrome bits coupled thereto, couples an active signal to one of the lines of cable 76 which indicates the bit position in the 38 data bits and the 7 check bits that are coupled to XOR logic 42 in which the previously detected single bit error (SBE) lies in the now double bit error (DBE) detected data word. After the delay required to perform the error correction upon the 38 data bits and the 7 check bits coupled thereto, XOR logic 42 couples to cable 78 the single bit error corrected, double bit error detected 38 data bits and 7 check bits that are coupled thereto by data bit register 28 and check bit register 32, respectively.

Note that the determination of a double bit error in the readout data bits and check bits enables the checking of syndrome bit register 36 for all 0's and parity checker 37 for a parity error. If either condition exists, an output from OR 75 and OR 17 results, which, in turn, causes a Data Parity Error signal, via DBE registers 82, to be coupled to the requesting requestor that was granted priority by priority logic 12. Thus, a syndrome bit parity error during a double bit error after single bit error operation has the same effect as a double bit error before single bit error operation producing an All 0's signal on line 74; both the syndrome bit parity error and the All 0's signal generate a Data Parity Error signal via line 75a, which, in effect, aborts the memory system operation.

After the delay required to correct the first single bit error in the double bit error detected data word that is presently held in data bit register 28 and check bit register 32, controller 18, as at time $t_3$, it still coupling an active DBE signal to line 54 which enables AND 27, AND 31 and AND 34 in which, via inverter (N) 60 and line 62, disables AND 26, AND 30 and AND 35. At time $t_3$ then, the timing chain in controller 18 couples to line 56 an active signal, which via the enabled AND 27 and AND 31 loads the single bit error corrected data bits and check bits, via cable 78b, from XOR logic 42 into data bit register 28 and check bit register 32 via the enabled AND 27 and AND 31, respectively. At time $t_3$ then, the once single bit error corrected 38 data bits on cable 64 are, via cable 64a, coupled to syndrome bit generator 38 and, via cable 64b, coupled to XOR logic 42 while the once single bit error corrected 7 check bits on cable 66 are, via cable 66a, coupled to syndrome bit generator 38 and, via cable 66b, coupled to XOR logic 42.

After the delay required to generate the second single bit error correcting syndrome bits from the once single bit error corrected, double bit error detected data word, syndrome bit generator 38 couples the second single bit error correcting syndrome bits, via cable 68, to AND 35 of syndrome bit register 36. Also at time $t_4$, syndrome bit generator 38 couples to controller 18 an active SBE signal via line 86, and an inactive DBE signal via line 88. At this time then, at time $t_4$, controller 18 couples an inactive DBE signal to line 54 which disables AND 27, AND 31 and AND 34 and which, inverter (N) 60 and line 62, enables AND 26, AND 30 and AND 35. Additionally, at this time the timing chain in controller 18 couples to line 58 an active signal, which via the enabled AND 35 loads the second single bit error correcting syndrome bits on cable 68 into syndrome bit register 36. The second single bit error correcting syndrome bits presently held in syndrome bit register 36 are then, via cable 72, coupled to syndrome bit decoder 40, which after the delay required to decode the syndrome bits coupled thereto, couples an active signal to one of the 45 lines of cable 76 indicating the bit position in the once single bit error corrected 38 data bits and 7 check bits that are coupled to XOR logic 42 in which the second single bit error (SBE) lies.

After the delay required to perform the second single bit error correction upon the once single bit error corrected 38 data bits and the 7 check bits coupled thereto, XOR logic 42 couples to cable 78 the modified, i.e., twice corrected, 38 data bits and 7 check bits coupled thereto by data bit register 28 and check bit register 32, respectively. Also this, at time $t_5$, causes the timing chain in controller 18 to couple active signals to line 90 and 92 whereby the Request Acknowledge signal via request acknowledge registers 84 and line 85 and the 38 data bits via interface registers 80 and cable 81 are coupled to the one requesting requestor that was granted priority by priority logic 12. Lastly, at this time the now single bit error corrected condition of the 38 data bits in data bit register 28 and the 7 check bits in check bit register 32 causes controller 18 to terminate memory operation until receipt of a subsequent CNP signal on line 16.

DOUBLE BIT ERROR BEFORE SINGLE BIT ERROR

With reference now to FIGS. 2d, 3a and 3d there is illustrated the operation of a memory system that is initially, i.e., as at a time prior to $t_0$, between memory operations and in which during a subsequent read operation a double bit error DBE is detected in the readout data word in which a single bit error (SBE) has not been previously detected and corrected. As discussed hereinabove with respect to FIG. 2a, during predetermined sampling periods as denoted by clock new priority (CNP) times, one or more of the N = 8 requesting requestors R0 through R7 couple their Priority Request signals to priority logic 12 via cable 13, and their requestor address words to MAR 14 via cable 15. At the end of the predetermined sample time as at time $t_0$, a CNP signal is coupled to priority logic 12 via line 16, which CNP signal initiates the priority determination by priority logic 12. At the end of the priority logic determination, priority logic 12 couples an Initiate Controller signal to controller 18 via line 20 an active signal to one of the N = 8 lines of cable 22, which active signal is representative of the one requesting requestor that has been granted priority by priority logic 12.

The Initiate Controller signal on line 20 initiates a timing chain in controller 18, which, via line 50, couples a Load MAR signal to gates 14a of MAR 14 loading in MAR 14 requestor address word on cable 15 that is associated with the one requesting requestor that was granted priority by priority logic 12. Next, the timing chain in controller 18 couples to line 52 an Initiate Memory signal. With the requestor address word on cable 24 being coupled to RAM 10, the Initiate Memory signal on line 52 selects or addresses the one addressable location in data bit memory 10a check bit memory 10b and syndrome bit memory 10c as defined by the address bits of the requestor address word on cable 24. As discussed with respect to FIG. 2a, this causes the simultaneous readout of the 38 data bits in data bit memory 10a, the 7 check bits, including one overall parity bit, from check bit memory 10b and the 6 syndrome bits from syndrome bit memory 10c.

At this time, at time $t_1$, controller 18 is coupling an inactive DBE signal to line 54 which disables AND 27, AND 31 and AND 34 and which, via inverter (N) 60 and line 62, enables AND 26, AND 30 and AND 35. Additionally, at this time the timing chain in controller 18 couples to line 56 an active signal, which via the enabled AND 26 and AND 30, loads the data bits from data bit memory 10a, on cable 25 into data bit register 28 and loads the check bits from check bit memory 10b on cable 29 into check bit register 32. At time $t_1$ the, the 38 data bits on cable 64 are, via cable 64a coupled to syndrome bit generator 38 and, via cable 64b, coupled to XOR logic 42 while the 7 check bits on cable 64 are, via cable 66a, coupled to syndrome bit generator 38 and, via cable 66b, couples to XOR logic 42.

As the 38 data bits and check bits that are coupled to syndrome bit generator 38 via their associated cables 64a and 66a, respectively, contain a double bit error (DBE), syndrome bit generator 38 at time $t_2$ couples to controller 18 an inactive SBE signal, via line 86, and an active DBE signal, via line 88. This double bit error condition (DBE) of the 38 data bits and 7 check bits presently held in data bit register 38 and check bit register 32, respectively, causes the timing chain in controller 18 to couple an active DBE signal to line 54, which enables AND 27, AND 31 and AND 34 and which, via inverter (N) 60 and line 62, disables AND 26, AND 30 and AND 35. Next, controller 18 couples to line 58 an active signal whereby the enabled AND 35 loads the readout syndrome bits from syndrome bit memory 10c on cable 33 into syndrome bit register 36. As no single bit error (SBE) has been previously detected in the 38 data bits and the 7 check bits presently held in data bit register 28 and check bit register 32, respectively, the 6 syndrome bits presently held in syndrome bit register 36 are all 0's. Accordingly, syndrome bit register 36 generates and couples to line 74 an active All 0's signal. Also, this at time $t_3$, causes the timing chain in controller 18 to couple active signals to lines 90 and 94 whereby the Request Acknowledge signal, via request acknowledge registers 84 and line 85 and the Data Parity Error signal via DBE registers 82 and line 83 are coupled to the one requesting requestor that was granted priority by priority logic 12. Lastly, at this time the double bit error uncorrectable condition of the 38 data bits in data bit register 28 and the 7 check bits in check bit register 32 causes controller 18 to terminate memory operation until receipt of a subsequent CNP signal on line 16.

What is claimed is:

1. A method of performing double bit error correction in a memory system incorporating only single bit error correction logic, comprising:
   storing a data word and associated zero bit error indicating syndrome bits at every addressable location of an addressable memory;
   examining one of said data words for a detected single bit error therein;
   generating single bit error connecting syndrome bits from said data word if a single bit error is detected therein;
   correcting said single bit error detected data word using said generated single bit error correcting syndrome bits;
   storing said single bit error correcting syndrome bits in the place of said associated zero bit error indicating syndrome bits;
   examining said corrected single bit error detected data word for a detected double bit error therein;
   correcting said double bit error detected data word using said stored single bit error correcting syndrome bits;
   generating single bit error correcting syndrome bits from said single bit error corrected, double bit error detected data word; and,
   correcting said single bit error corrected, double bit error detected data word using said single bit error correcting syndrome bits that were generated from said once single bit error corrected, double bit error detected data word.

2. A method of performing double bit error correction in a memory system incorporating only single bit error correction, comprising:
   storing a data word and associated zero bit error indicating syndrome bits at every addressable location of an addressable location of an addressable memory;
   examining one of said data words for a detected single bit error therein;
   generating single bit error correcting syndrome bits from said examined data word only if a single bit error is detected therein;
   correcting said examined data word only if said generated single bit error correcting syndrome bits indicate a detected single bit error exists in said examined data word;
   storing said single bit error correcting syndrome bits in the place of said associated zero bit error indicating syndrome bits only if said single bit error correcting syndrome bits indicate a detected single bit error exists in said examined data word;
   examining a data word for a detected double bit error therein;
   correcting said examined double bit error detected data word for a single bit error therein using said stored single bit error correcting syndrome bits;
   generating single bit error correcting syndrome bits from said once single bit error corrected, double bit error detected data word; and,
   correcting said once single bit error corrected, double bit error detected data word using said single bit error correcting syndrome bits that were generated from said once single bit error corrected, double bit error detected data word.

3. A memory system performing double bit error correction, comprising:
   addressable memory means comprised of a plurality of addressable locations, each of said addressable locations including data bit memory means and syndrome bit memory means having associated data bits that form a data word and associated syndrome bits that identify a single bit in error in the associated data word, which associated data bits and syndrome bits are stored therein at each of the associated one of said plurality of addressable locations;
   data word register means;
   syndrome bit register means;

syndrome bit generator means for generating associated syndrome bits from a data word that is coupled thereto;

syndrome bit decoder means for decoding the syndrome bits that are held in said syndrome bit register means and generating a decoded signal that is indicative of the bit position of the single bit in error in said associated data word;

single bit error correction means coupled to said data word register means and said syndrome bit decoder means for correcting the single bit in error in said data word and generating a corrected data word;

means coupling said decoded signal from said syndrome bit decoder means to said single bit error correction means;

means coupling associated data word and syndrome bits to said data word register means and said syndrome bit register means from said data bit memory means and said syndrome bit memory means, respectively;

means coupling said data word that has been gated into said data word register means to said syndrome bit generator means;

means coupling the data word that has been gated into said data word register means to said single bit error correction logic means;

means coupling the generated syndrome bits from said syndrome bit generator means to said syndrome bit register means and said syndrome bit memory means;

means coupling said corrected data word bits from said single bit error correction means to said data word register means;

means responsively coupled to said syndrome bit generator means for gating said data word into said data word register means when said syndrome bit generator means determines that there is no double bit error in said data word, or alternatively, gating said corrected data word from said single bit error correction means into said data word register means, when said syndrome bit generator means determines that there is a double bit error in said data word;

means responsively coupled to said syndrome bit generator means for gating said syndrome bits from said syndrome bit memory means into said syndrome bit register means only when said syndrome bit generator means determines that there is a single bit error in said data word, or, alternatively, gating said syndrome bits from said syndrome bit generator means into said syndrome bit register means when said syndrome bit generator means determines that there is a double bit error in said data word; and, means responsively coupled to said syndrome bit generator means for gating said syndrome bits from said syndrome bit generator means into syndrome bit memory means when said syndrome bit generator means determines that there is a double bit error in said data word.

4. A memory system performing double bit error correction, comprising:

addressable memory means comprised of a plurality of addressable locations, each of said addressable locations including data bit memory means, check bit memory means and syndrome bit memory means having associated data bits and check bits that form a data word and associated syndrome bits that identify a single bit in error in the associated data word, which associated data bits, check bits and syndrome bits are stored therein at an associated one of said plurality of addressable locations;

data bit register means;

check bit register means;

syndrome bit register means;

syndrome bit generator means for generating associated syndrome bits from the associated data bits and check bits of a data word that are coupled thereto;

syndrome bit decoder means for decoding the syndrome bits that are held in said syndrome bit register means and generating a decoded signal that is indicative of the bit position of the single bit in error in said associated data bits and check bits;

single bit error correction means coupled to said data bit register means, said check bit register means and said syndrome bit decoder means for correcting the single bit in error in said data bits and check bits and generating corrected data bits and corrected check bits;

means coupling said decoded signal from said syndrome bit decoder means to said single bit error correction means;

means coupling an address word to said addressable memory means for addressing the associated data bits, check bits and syndrome bits that are stored at the associated addressable location;

means coupling said addressed associated data bits, check bits and syndrome bits from said addressable memory means to said data bit register means, said check bit register means and said syndrome bit register means, respectively;

means coupling the associated data bits and check bits that have been gated into said data bit register means and said check bit register means, respectively, to said syndrome bit generator means;

means coupling the associated data bits and check bits that have been gated into said data bit register means and said check bit register means, respectively, to said single bit error correction logic means;

means coupling the generated syndrome bits from said syndrome bit generator means to said syndrome bit register means and said syndrome bit memory means;

means coupling said corrected data bits and corrected check bits from said single bit error correction means to said data bit register means and said check bit register means, respective;

means responsively coupled to said syndrome bit generator means for gating said addressed associated data bits and check bits from said addressable memory means into said data bit register means and said check bit register means, respectively, when said syndrome bit generator means determines that there is no double bit error in said addressed associated data bits and check bits, or, alternatively, gating said corrected data bits and corrected check bits from said single bit error correction means into said data bit register means and said check bit register means, respectively, when said syndrome bit generator means determines that there is a double bit error in said addressed associated data bits and check bits;

means responsively coupled to said syndrome bit generator means for gating said addressed syndrome bits from said addressable memory means into said syndrome bit register means only when said syndrome bit generator means determines that there is a single bit error in said addressed associated data bits and check bits, or, alternatively, gating said generated syndrome bits from said syndrome bits generator means into said syndrome bit register means when said syndrome bit generator means determines that there is a double bit error in said addressed associated data bits and check bits; and, means responsively coupled to said syndrome bit generator means for gating said generated syndrome bits from said syndrome bit generator means into the same addressable location in said syndrome bit memory means as is the addressable location of the addressed associated data bits and check bits in said data bit memory means and said check bit memory means, respectively, when said syndrome bit generator means determines that there is a double bit error in said addressed associated data bits and check bits.

5. A memory system performing double bit error correction, comprising:

addressable memory means comprised of a plurality of addressable locations, each of said addressable locations including data bit memory means, check bit memory means and syndrome bit memory means having associated data bits and check bits that form a data word and associated syndrome bits that identify a single bit in error in the associated data word, which associated data bits, check bits and syndrome bits are stored therein at an associated one of said plurality of addressable locations;

memory address register means adapted to receive and store one of a plurality of multibit address words from a like plurality of requesting requestors for addressing one of the addressable locations in said addressable memory means;

priority logic means adapted to receive one or more of a plurality of priority request signals from a like plurality of requesting requestors for determining which one of said requesting requestors is to be granted priority;

means coupling said priority logic means to said memory address register means for selecting and storing in said memory address register means the address word coupled thereto by the requesting requestor that was granted priority by said priority logic means;

data bit register means;

check bit register means;

syndrome bit register means;

syndrome bit generator means for generating associated syndrome bits from the associated data bits and check bits of a data word that are coupled thereto;

syndrome bit decoder means for decoding the syndrome bits that are held in said syndrome bit register means and generating a decoded signal that is indicative of the bit position of the single bit in error in said associated data bits and check bits;

single bit error correction means coupled to said data bit register means, said check bit register means and said syndrome bit decoder means for correcting the single bit in error in said data bits and check bits and generating corrected data bits and corrected check bits;

means coupling said decoded signal from said syndrome bit decoder means to said single bit error correction means;

means coupling said selected address word from said memory address register means to said addressable memory means for addressing the associated data bits, check bits and syndrome bits that are stored at the associated addressable location;

means coupling said addressed associated data bits, check bits and syndrome bits from said addressable memory means to said data bit register means, said check bit register means and said syndrome bit register means, respectively;

means coupling the associated data bits and check bits that have been gated into said data bit register means and said check bit register means, respectively, to said syndrome bit generator means;

means coupling the associated data bits and check bits that have been gated into said data bit register means and said check bit register means, respectively, to said single bit error correction logic means;

means coupling the generated syndrome bits from said syndrome bit generator means to said syndrome bit register means and said syndrome bit memory means;

means coupling said corrected data bits and corrected check bits from said single bit error correction means to said data bit register means and said check bit register means, respectively;

means responsively coupled to said syndrome bit generator means for gating said addressed associated data bits and check bits from said addressable memory means into said data bit register means and said check bit register means, respectively, when said syndrome bit generator means determines that there is no double bit error in said addressed associated data bits and check bits, or, alternatively, gating said corrected data bits and corrected check bits from said single bit error correction means into said data bit register means and said check bit register means, respectively, when said syndrome bit generator means determines that there is a double bit error in said addressed associated data bits and check bits;

means responsively coupled to said syndrome bit generator means for gating said addressed syndrome bits from said addressable memory means into said syndrome bit register means only when said syndrome bit generator means determines that there is a single bit error in said addressed associated data bits and check bits, or, alternatively, gating said generated syndrome bits from said syndrome bit generator means into said syndrome bit register means when said syndrome bit generator means determines that there is a double bit error in said addressed associated data bits and check bits; and, means responsively coupled to said syndrome bit generator means for gating said generated syndrome bits from said syndrome bit generator means into the same addressable location in said syndrome bit memory means as is the addressable location of the addressed associated data bits and check bits in said data bit memory means and said check bit memory means, respectively, when said syndrome bit generator means determines that there is a double bit error in said addressed associated data bits and check bits.

* * * * *

UNITED STATES PATENT AND TRADEMARK OFFICE
CERTIFICATE OF CORRECTION

PATENT NO. : 4,139,148
DATED : February 13, 1979
INVENTOR(S) : JAMES H. SCHEUNEMAN It is certified that error appears in the above-identified patent and that said Letters Patent are hereby corrected as shown below:

Column 11, Line 66, "connecting" should be

-- correcting --.

Signed and Sealed this

Twelfth Day of June 1979

[SEAL]

Attest:

RUTH C. MASON
*Attesting Officer*

DONALD W. BANNER
*Commissioner of Patents and Trademarks*